United States Patent [19]

Rodriguez-Cavazos et al.

[11] Patent Number: 4,977,355
[45] Date of Patent: Dec. 11, 1990

[54] CONVERGENCE CONTROL SYSTEM

[75] Inventors: Enrique Rodriguez-Cavazos, Indianapolis; Robert D. Altmanshofer, Carmen, both of Ind.; Robert P. Parker, Westborough, Mass.; Estill T. Hall, Jr., Fishers, Ind.

[73] Assignee: RCA Licensing Corportion, Princeton, N.J.

[21] Appl. No.: 397,532

[22] Filed: Aug. 23, 1989

[51] Int. Cl.$^5$ .......................... H01J 29/70; H01J 29/76
[52] U.S. Cl. ..................................................... 315/368
[58] Field of Search ........................................ 315/368

[56] References Cited

U.S. PATENT DOCUMENTS

| | | | |
|---|---|---|---|
| 4,401,922 | 8/1983 | Kamata et al. | 315/368 |
| 4,422,019 | 12/1983 | Meyer | 315/368 |
| 4,437,110 | 3/1984 | Hunaut et al. | 358/41 |
| 4,473,844 | 9/1984 | Klein | 358/163 |
| 4,549,117 | 10/1985 | Takahashi et al. | 315/371 |
| 4,553,164 | 11/1985 | Labb | 358/163 |
| 4,635,117 | 1/1987 | Labb | 358/160 |
| 4,672,275 | 6/1987 | Ando | 315/368 |
| 4,680,510 | 7/1987 | Spieth et al. | 315/368 |
| 4,754,204 | 6/1988 | Ando et al. | 315/367 |

OTHER PUBLICATIONS

Application Guide From Analog Devices, pp. 43–46, Section 6.5.3.

Primary Examiner—Theodore M. Blum
Attorney, Agent, or Firm—Joseph S. Tripoli; Joseph J. Laks; Harvey D. Fried

[57] ABSTRACT

A convergence control system for a television apparatus, for example a projection television, comprises: a plurality of channels, each channel having a digital memory for storing a set of grid coordinate values defining a convergence correction grid; and, a pair of multiplying digital to analog converters for the grid coordinate values. A single circuit for generating sequential digital addresses is coupled to each of the channels for outputting the grid coordinate values from each of the digital memories to respective multiplying digital to analog converters of the channel. The values of respective horizontal grid lines are supplied to only one of the multiplying digital to analog coverters. A single waveform generator develops a pair of analog waveforms of complementary phase for modulating respective multiplying digital to analog converters of each pair in each channel. The sum of the modulating waveforms is constant. The succession of modulated analog values define the convergence correction signal for each channel.

20 Claims, 8 Drawing Sheets

| AFTER COUNT | LATCH 1 | LATCH 2 | LATCH 3 | LATCH 4 |
| --- | --- | --- | --- | --- |
| 1 | B | C | A | C |
| 2 | B | C | A | C |
| 3 | B | D | A | C |
| 4 | B | D | B | D |
| 5 | H | D | B | D |
| 6 | H | D | B | D |
| 7 | H | I | B | D |
| 8 | H | I | H | I |

CONVERGENCE CONTROL SYSTEM

This invention relates to the field of digital convergence systems in television apparatus, and in particular, to digital convergence systems having improved analog interpolators for output processing.

Certain television apparatus require sophisticated convergence control systems. Projection television apparatus, for example, comprise three projection cathode ray tubes, which project red, blue and green rasters, respectively. The images projected by each video projection tube must be properly aligned with one another. Analog waveforms have been used to provide the correction necessary to obtain a substantially correct raster for all three cathode ray tubes. A conventional analog waveform generator will normally correct for the first order in perfections of the raster, but not for the more complicated distortions usually found in such apparatus.

Digital convergence correction systems have been developed to generate more complex correction signals. In one kind of such system, a digital correction value is stored for each and every point of a very extensive grid, points being defined along each horizontal scanning line, or as many as possible. This approach would provide maximum correction, but is difficult and expensive to implement. In another kind of such system, a smaller number of correction values are stored, and a digital interpolation circuit determines intermediate values, based on the known values. Digital interpolators can produce good results, but are also expensive to implement. In many cases, the minimum bit requirements of certain components, for example digital- to analog converters, needed for the necessary resolution preclude embodying digital interpolators as integrated circuits. In a third kind of system, the smaller number of correction values are stored digitally, but the interpolation is performed in the analog domain. This has proved advantageous, as such circuits can provide adequate precision and resolution, at a lower cost. The resolution of digital-to-analog converters in such circuits is often critical, as the resolution will determine whether or not the interpolation circuit can be integrated.

Digital processing may be utilized by this invention in conjunction with analog domain interpolation to generate precise waveforms to provide convergence correction signals, for example, for aligning images from multiple video projection tubes. This combination of digital and analog signal generation reduces the range of signals that the digital portion must handle and thus reduces necessary resolution of any digital to analog converters and the amount of digital storage capacity. The reduction in resolution of the digital to analog converters enables the interpolation circuit to be integrated.

A digital convergence system with an analog output processor is disclosed in U.S. Pat. No. 4,422,019 - Meyer. Other digital convergence control systems, utilizing digital or analog interpolation circuits, are disclosed in the following U.S. Pat. Nos.: 4,401,922; 4,437,110; 4,473,844; 4,549,117; 4,553,164; 4,635,117; and 4,672,275.

The active scan area of a display screen, for example, is divided into a matrix of rows and columns, the boundary lines of which in turn define a cross hatch grid. The number of rows and columns, and accordingly the number of sections, is somewhat arbitrary and depends upon the expected range of correction which is needed, and the desired level of perfection in the resulting raster.

During alignment, the green geometry and the red and green DC adjustments are performed first. Thereafter, the exact value of the correction signal at every grid point is determined by superimposing the red, green and blue rasters at that point. These exact values are stored in a non-volatile memory and represent for each correction signal which is required the alignment information for that particular apparatus or instrument.

An interpolation must be performed in both the vertical and horizontal directions in order to provide a smooth transition of the correction signals between adjacent grid points. Each section is defined by values at the four grid points defining the corners of that section. A two-dimensional interpolation must be performed from the known values at the grid points in order to obtain the appropriate correction signal at all points within that section. The interpolation in the horizontal direction may be performed relatively easily, for example by low pass filtering the correction values. This straight forward scheme is possible because the known values occur sequentially as each horizontal line is scanned. For example, to smoothly go from a correction value at point A to an immediately horizontally adjacent correction value at point B, it is necessary to sequentially output the value $V_A$ during a time period equal to a grid spacing between points A and B, and then to output value $V_B$ for the same period. As long as the filter response time is equal to the grid spacing, the correction signal will make a smooth transition from value $V_A$ to value $V_B$. The response time is dependent upon the filter at the output of the digital to analog converter and the response time of the convergence power amplifier which drives the convergence correction coil.

Interpolation in the vertical direction is significantly more difficult, because the known values of vertically adjacent grid points are not sequential as each horizontal line is scanned. In accordance with an aspect of this invention, vertical interpolation is performed in the analog domain by using two multiplying digital to analog converters for each channel in which a convergence correction signal is generated. Although this increases the number of digital to analog converters needed, as compared to a fully digital convergence system, those multiplying digital to analog converters which are required need less resolution than those which are needed for a fully digital system. The lower level of resolution makes it possible for the multiplying digital to analog converters to be fully integrated in a chip.

A digital convergence control system with an analog output processor, of the kind generally under consideration, comprises: a digital memory for storing a set of digital grid coordinate values defining a convergence correction grid for one channel of a video display, a convergence correction signal generator responsive to the grid coordinate values and to intermediate values between the grid coordinate values, and an interpolating circuit for determining the intermediate values.

An interpolating circuit for determining the intermediate values in accordance with one aspect of the invention, comprises: a waveform generator for developing modulating waveforms of complementary phase; and, first and second multiplying digital to analog converters for the grid coordinate values, each of the multiplying digital to analog converters receiving as a multiplying reference input a different one of the modulating waveforms.

In accordance with a further aspect of the invention, the first and second multiplying digital to analog converters receive the grid coordinate values directly for conversion to analog form and multiplication by the modulating signals.

In accordance with another aspect of the invention, the modulating waveforms are of complementary phase and amplitude, the waveforms having a period related to the number of horizontal scanning lines between vertically adjacent grid coordinate values.

In accordance with yet another aspect of the invention relating to television apparatus requiring a plurality of processing channels, the digital memories in each of the channels receive the same address signals and timing signals and receive the same pair of modulating waveforms for multiplying the converted digital values.

A convergence control system for a projection television apparatus in accordance with this aspect of the invention comprises a plurality of channels, each channel having a digital memory for storing a set of grid coordinate values defining a convergence correction grid and a pair of multiplying digital to analog converters for the grid coordinate values. A circuit for generating sequential digital addresses is coupled to each of the channels for outputting the grid coordinate values from each of the digital memories to respective multiplying digital to analog converters of the channel. A waveform generator develops a pair of analog waveforms of complementary phase for modulating respective multiplying digital to analog converters of each pair in each channel. The sum of the modulating waveforms is constant. The succession of modulated analog values define the convergence correction signal for each channel.

FIGS. 4(c) and 4(d) show peak and trough portions respectively of the waveform shown in FIG. 4(a), in enlarged scale.

Figure 1:
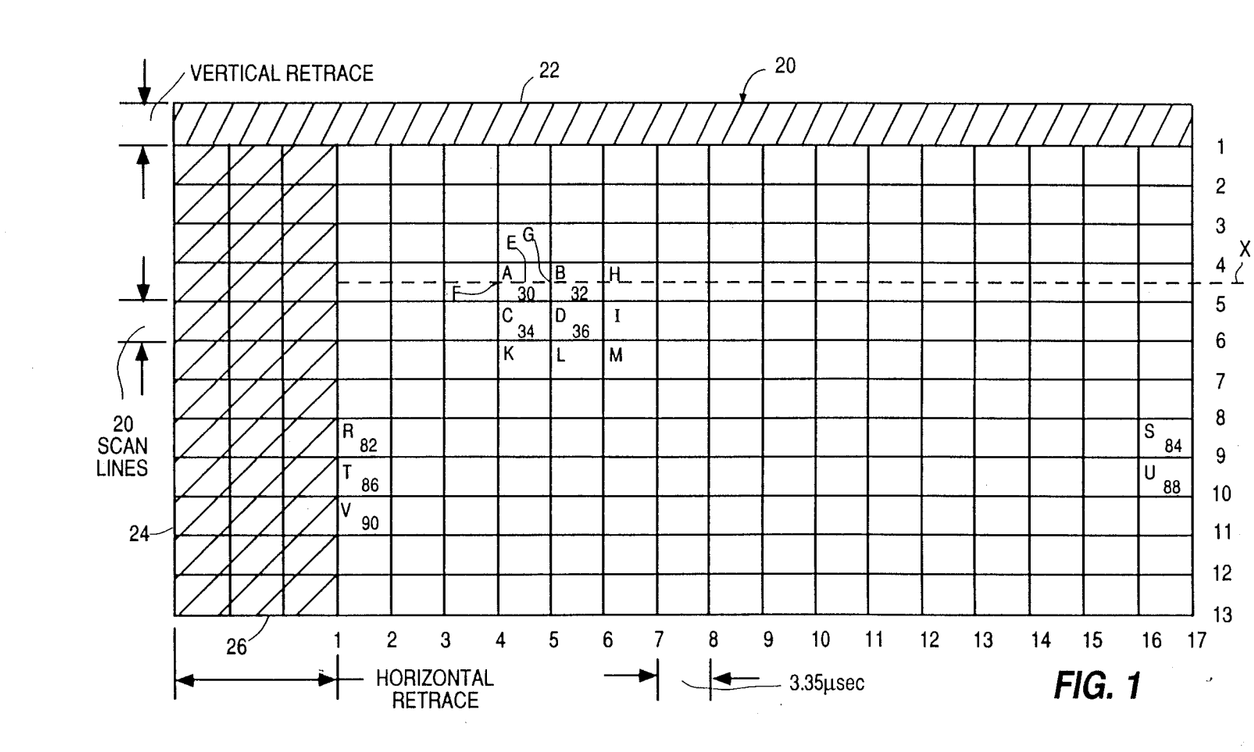
FIG. 1 illustrates a matrix defining a convergence correction grid for a video display.

The scan area of a raster 20 is shown in FIG. 1. The scan area 20 is defined by a plurality of sections or blocks, for example 30, 32, 34, 36, etc., forming a matrix. The uppermost row of the matrix defining area or portion 22 represents the time necessary for a vertical retrace, approximately 825 microseconds for a conventionally scanned NTSC signal, generally denoted as operating at a 1H rate. The three leftmost columns defining area or portion 24 represent the time needed for each horizontal retrace, which for the same 1H signal is approximately 10 microseconds. Areas or portions 22 and 24, representative of the vertical and horizontal retrace times respectively are inactive scan areas. The remaining area or portion 26 is the active scan area. The size of the active scan area and the grid is somewhat larger than, for example, the boundaries of the projection screen of the projection television apparatus or the image display portion of the cathode ray tube in a direct view television. This assures convergence correction for all visible scan lines. The active scan area 26 is defined by a matrix of 12 rows and 16 columns, which define a convergence correction grid having 13 horizontal grid lines and 17 vertical grid lines, respectively so numbered. The horizontal scan time between each adjacent vertical grid line is approximately 3.35 microseconds. Twenty scan lines are required for traversing each row of the grid between adjacent horizontal grid lines, for the NTSC 1H signal. There are 19 intermediate scan lines between each horizontal grid line.

Reference numerals 30, 32, 34 and 36 specifically identify four blocks or sections. Block or section 30 is bounded by grid intersection points A, B, C and D. Block or section 32 is bounded by grid intersection points B, H, D and I. Block or section 34 is bounded by grid intersection C, D, K and L. Block or section 36 is bounded by grid intersection points D, I, L and M. Blocks or sections 30 and 32 are shown in enlarged scale in FIG. 6.

In terms of the standard notation of an (X, Y) coordinate system, grid point A lies on coordinates (4, 4). Grid point B lies on coordinates (5, 4). Grid point H lies on coordinates (6, 4). Grid point C lies on coordinates (4, 5). Grid point D lies on coordinates (5, 5). Grid point I lies on coordinates (6, 5).

Figure 2:
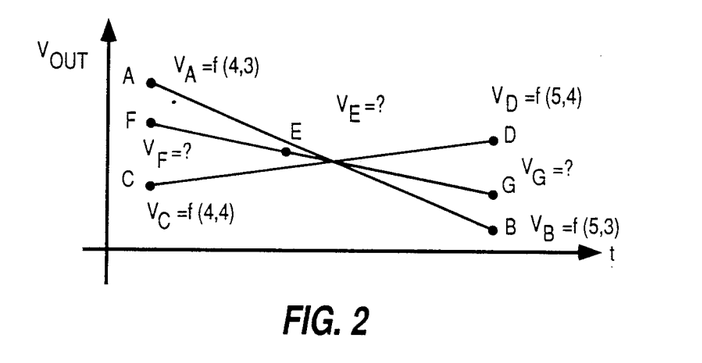
FIG. 2 graphically illustrates a method for vertical interpolation.

With further reference to FIG. 2, the exact value of the correction signal at every grid point is determined by superimposing the red, green and blue rasters at that point. These exact values are stored in non-volatile memory for each channel and represent the alignment information for that particular television apparatus or instrument. If the digital storage is thought of, for purposes of illustration, as a corresponding matrix, the grid correction value will be a function of the coordinates of the particular grid point. In other words, the convergence correction value for grid point A in one of the channels will be a function of the coordinates (4, 4), that is, the correction value $V_A = f(4, 4)$. Similarly, the correction value $V_B = f(5, 4)$, the correction value $V_C = f(4, 5)$ and correction value $V_D = f(5, 5)$.

In order to provide a smooth transition of the correction signals between adjacent grid points, the interpolation must be performed in both the vertical and horizontal directions, as shown in FIG. 2. The values at the grid points, represented by $V_A$ and $V_B$ and $V_C$ and $V_D$, are the exact desired values determined during alignment. A two-dimensional interpolation must be performed from these known values to obtain the correction signal at all of the points within that block or section. The unknown values $V_F$ and $V_E$ and $V_G$ are, for example, part of a horizontal scan line that does not fall exactly on a grid line.

The interpolation in the horizontal direction may be performed by low pass filtering the correction values, because the known convergence values occur sequentially as each horizontal scan line proceeds. In order to smoothly go from grid value $V_A$ to grid value $V_B$, it is necessary only to sequentially output value $V_A$ during a time period equal to a grid spacing, for example 3.35 microseconds, and then value $V_B$ for the same time period. If the filter response time is equal to the grid spacing, the correction signal will make a smooth transition from value $V_A$ to value $V_B$. The response time will depend upon the filter at the output of the digital to analog converter and the response of the convergence power amplifier.

Interpolation in the vertical direction requires more processing because vertically adjacent grid coordinate values do not occur sequentially during the same horizontal scan line. Instead, for example, the unknown values VF and $V_G$ on scan line X in FIGS. 1 and 6 must be determined from the known values, for example $V_A$ and $V_B$ and $V_C$ and $V_D$. If values $V_F$ and $V_G$ can first be determined, these values can then be subjected to the low pass filtering for horizontal interpolation. This horizontal interpolation, for example, will develop correction value $V_E$ as well as all other intermediate values on the line segment $F_G$.

Figure 6:
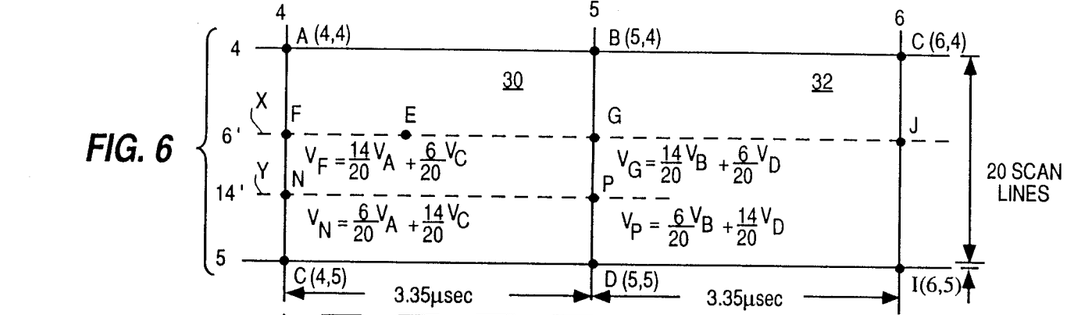
FIG. 6 is a portion of the matrix shown in FIG. 1, in enlarged scale.

Consider the interpolation necessary for blocks or sections 30 and 32, with particular reference to FIG. 6. In order to scan along the fourth horizontal grid line, without regard for other lines or interpolation, the low pass filter must be fed with the values for grid points A, B and H sequentially at intervals of approximately 3.35 microseconds. However, intermediate lines impose a need for an interpolation scheme which treats rows of blocks at a time, as each row of blocks represents a set of horizontal scan lines. An interpolation scheme illustrated in FIG. 6 is based upon the fact that twenty horizontal scan lines are required to traverse the screen or other display from and including the fourth horizontal grid line to just above the fifth horizontal grid line, as is the case for all adjacent horizontal grid lines. Two intermediate scanning lines X and Y are further identified as 6' and 14' respectively. Intermediate scan line 6' includes line segment FG, as shown in FIG. 1. Intermediate scan line 14' includes line segment NP. In an effort to smooth the transition between vertically adjacent grid points, a higher weighting factor is applied to the intermediate values closest a particular known grid value. For example, point F is six arbitrary units below point A and fourteen arbitrary units above point C. The arbitrary units correspond to the vertical separation between horizontal scan lines, which will change for different vertical formats and different video transmission systems. Accordingly, the value $V_f = 14/20$ $V_A + 6/20$ $V_C$. Similarly, intermediate point N is fourteen units below point A and six units above point C. The intermediate value $V_N = 6/20$ $V_A + 14/20$ $V_C$. Intermediate values $V_G$ and $V_P$ for intermediate points G and P respectively may be calculated in a similar fashion. If $V_A = 2$ and $V_C = 1$, then $V_F = 1.7$ and $V_N = 1.3$. Such values exemplify the smooth transition between points A and C.

Vertical interpolation can be seen as sequentially generating and processing intermediate convergence correction values for the intersection of each intermediate horizontal scanning line and a vertical grid line. If these corrections values can be presented in proper sequence to the horizontal low pass filtering circuit, with proper timing, a precise convergence correction signal can be generated in real time.

A circuit for sequentially supplying the proper known correction values and subsequently interpolating those values is shown in block diagram form in FIG. 3. A portion corresponding to a single channel in a multichannel system is designated by reference numeral 40. A part of the overall circuit common to all channels comprises a PLL (phase locked loop) and timing generator 42 and an address generator 44. A second part 40 of the overall circuit comprises digital convergence correction value storage means 46, four 8-bit latches identified as L1, L2, L3 and L4, and a pair of multiplying digital to analog converters 56 and 58, the outputs of which are summed by operational amplifier 60. Modulating waveforms shown in FIGS. 4(a) and 4(b) identified as Veven and Vodd are generated by the circuit shown in block diagram form in FIG. 5(a) and supplied respectively to multiplying digital to analog converters 56 and 58. The circuit can also be constructed with only three latches, provided that the timing sequence is suitably revised.

Figure 3:
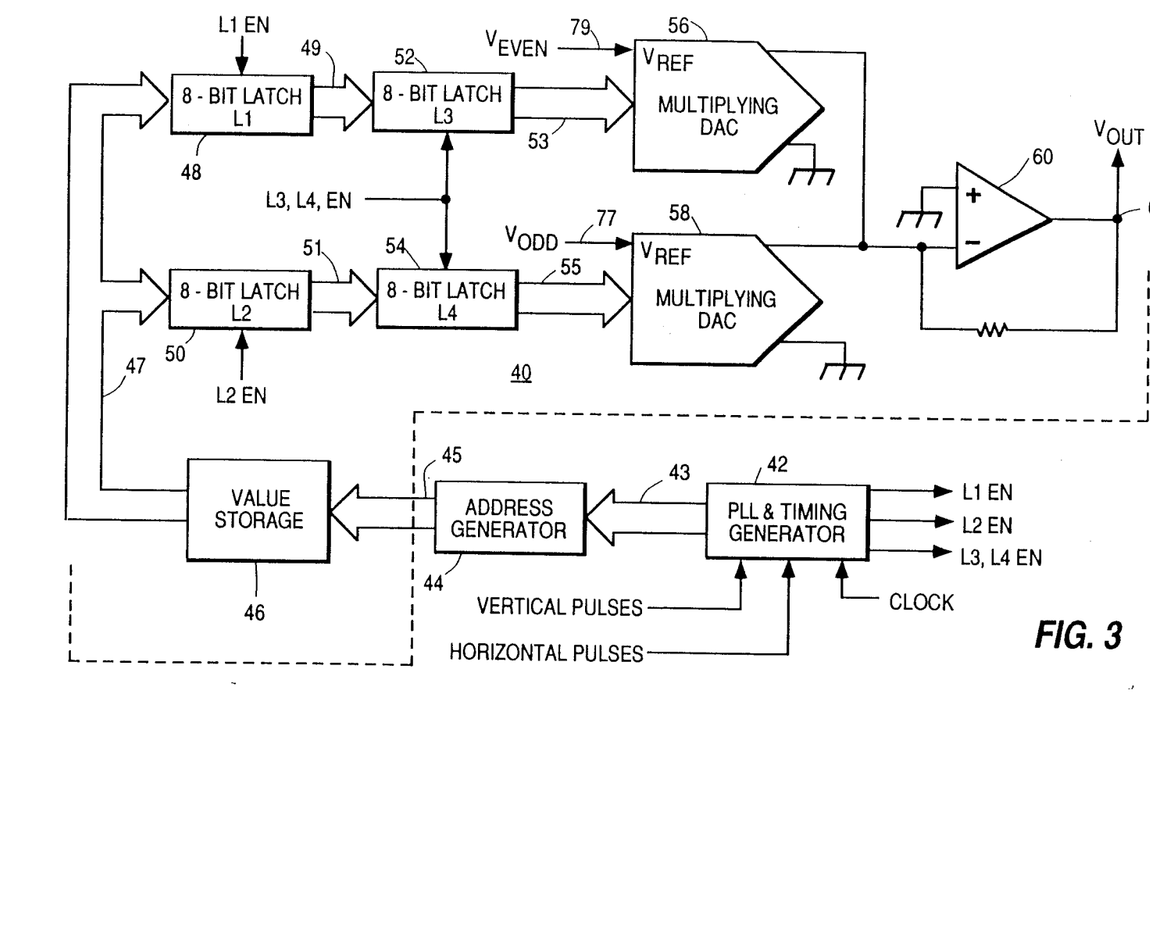
FIG. 3 is a block diagram of a circuit for a single channel in a digital convergence control system in accordance with an aspect of the invention.

With reference to FIG. 3, the phase locked loop and timing generator 42 receives horizontal and vertical synchronizing pulses, or timing pulses related thereto, from the deflection circuit of the television apparatus. The phase locked loop and timing generator produces a phase or line locked clock running at 76 times the horizontal frequency, which for a conventionally interlaced scan 1H NTSC standard is approximately 1.2 MHz. The vertical and horizontal timing signals and the clock signal are all of the timing signals necessary for operating the address generator and the latches for the multiplying digital to analog converters. The line locked clock may also be used to produce an alignment test pattern.

The address generator 44 receives appropriate timing pulses from the phase locked loop and timing generator 42, and generates the necessary address to select the next word to be loaded into the multiplying digital to analog converters. Each such word corresponds to the convergence correction value for a particular grid point, expressed and stored in digital form.

The words, or correction values, for each channel are stored in a digital value storage means 46. Storage means 46 may be non-volatile. Alternatively, storage means 46 may be volatile memory, which is loaded from non-volatile storage means at another location in the apparatus, for example during the power-up operation.

The output of storage means 46 is available as an input to both latches L1 and L2. The output of latch L1 is an input to latch L3, and the output of latch L3 is an input to the converting input of multiplying digital to analog converter 56. The output of latch L2 is an input to latch L4, and the output of latch L4 is an input to the converting input of multiplying digital to analog converter 58. The latches are used to store the present and next values for each multiplying digital to analog converter. Latches L1 and L2 are sequentially loaded with the next two values, and latches L3 and L4 are simultaneously loaded when it is time to update the multiplying digital to analog converter outputs.

The timing diagram shown in FIG. 7(a)-7(f) corresponds in time scale to the horizontal separation of the vertical grid lines shown in FIG. 6. FIG. 8 is a chart showing the contents of latches L1, L2, L3 and L4 during the horizontal scan line coinciding with the fourth horizontal grid line. The sequence of values supplied to the latches from the storage means, responsive to the address generator, is A C B D H I. At the initiation of clock pulse 1 in FIG. 7(a), latch L1 contains the correction value for point A, latch L4 contains the correction value for point C, latch L3 contains the correction value for point A, and latch L4 contains the correction value for point C. Accordingly, multiplying digital to analog converter 56 converts the digital value for point A to analog form, multiplying that analog value by the amplitude of the Veven modulating waveform on line 79. For the row of blocks shown in FIG. 6, this amplitude will be one. Similarly, the correction value for point C is converted to analog form by multiplying digital to analog converter 58, and subsequently multiplied by the value of the Vodd modulating waveform on line 77. For the row shown in FIG. 6, this value is zero.

Figures 7A, 7B:
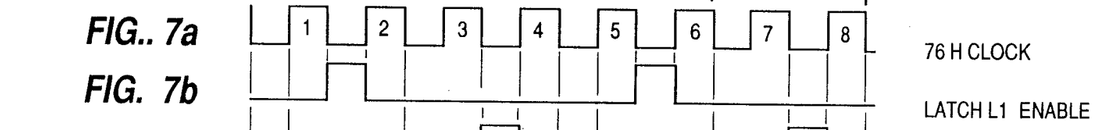
FIGS. 7(a) through 7(f) illustrate timing signals for operation of the digital convergence control system shown in FIG. 3.
Figure 7C:
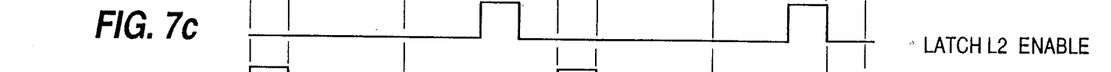
Figure 7D:
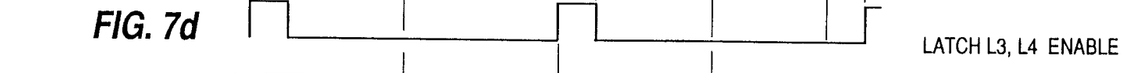
Figures 7E, 7F:
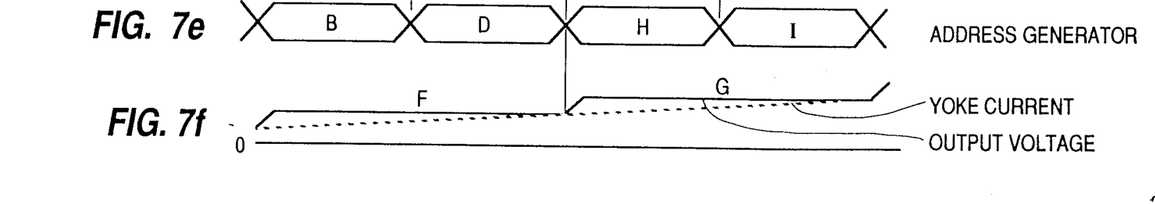
Figure 8:
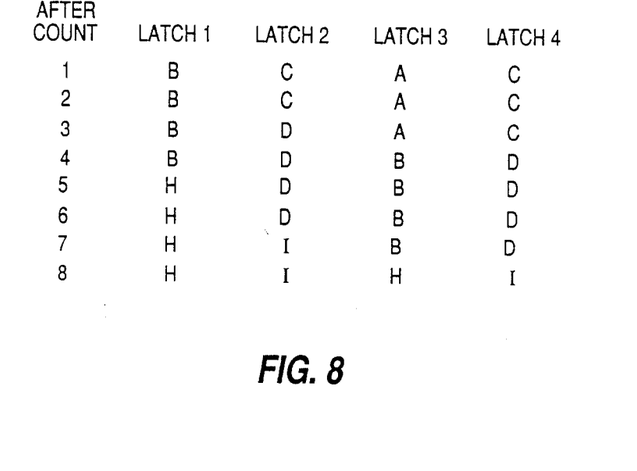
FIG. 8 is a chart illustrating the sequential output of the grid coordinate values to the multiplying digital to analog converters in FIG. 3.

A latch L1 enable pulse L1 EN shown in FIG. 7(b) occurs at the end of clock pulse and loads the correction value for point B into latch L1. A latch L2 enable pulse L2 EN shown in FIG. 7(c) occurs at the end of clock pulse 3 and loads the correction value for point D into latch L2. A latch L3, L4 enable pulse L3, L4 EN shown in FIG. 7(d) occurring at the end of clock pulse 4 loads the correction value for point B into latch L3 and the correction value for point D into latch L4. A similar process takes place during clock pulses 5 through 8, whereby at the end of clock pulse 8, the correction value for point H is stored in latch L3 and the correction value for point I is stored in latch L4. It can be appreciated that the correction values for points A and C remain in latches L3 and L4 respectively for four clock periods, which is equivalent to the 3.35 microsecond interval between the fourth and fifth vertical grid lines. As the horizontal scan line proceeds from left to right along the fourth horizontal grid line, the correction values for points A and C are being processed by the multiplying digital to analog converters while the scan line is between the fourth and fifth vertical grid lines. The correction values for points B and D are processed by the multiplying digital to analog converters while the horizontal scan proceeds from the fifth vertical grid line to the sixth vertical grid line. The correction values for points H and I are processed by the multiplying digital to analog converters while the horizontal scan proceeds from the sixth vertical grid line to the seventh vertical grid line. FIG. 7(f) illustrates the yoke current and output voltage for the intermediate scan line 6'. The current and voltage waveforms are illustrative of all of the horizontal scan lines. The output voltage changes in steps. The yoke current proceeds smoothly from known value to known value as a result of the low pass filtering.

Alternatively, either of latches L2 and L4 may be omitted. If latch L2 is omitted, then L3, L4 EN can occur after clock pulse 3, moving $V_B$ from latch L1 to latch L3 and moving $V_D$ into latch L4. The L2 EN signal is unnecessary. The fourth latch shown in FIG. 3 is included to facilitate the explanation.

Figure 4A:
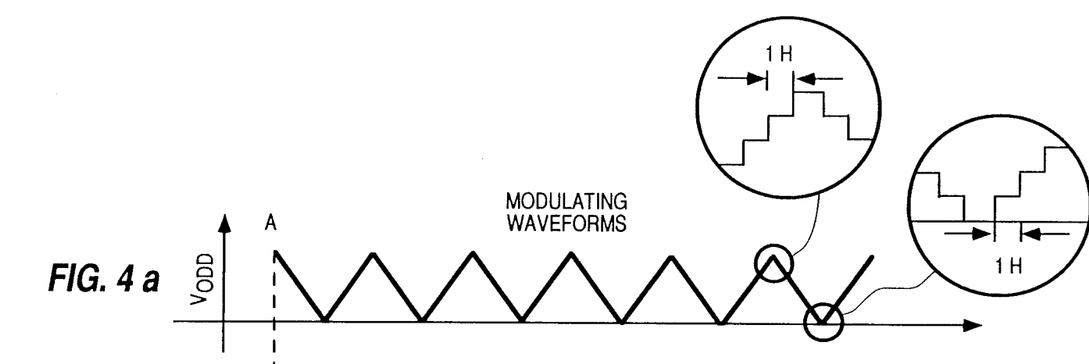
FIGS. 4(a) and 4(b) illustrate modulating waveforms for the multiplying digital to analog converters shown in FIG. 3.
Figure 4B:
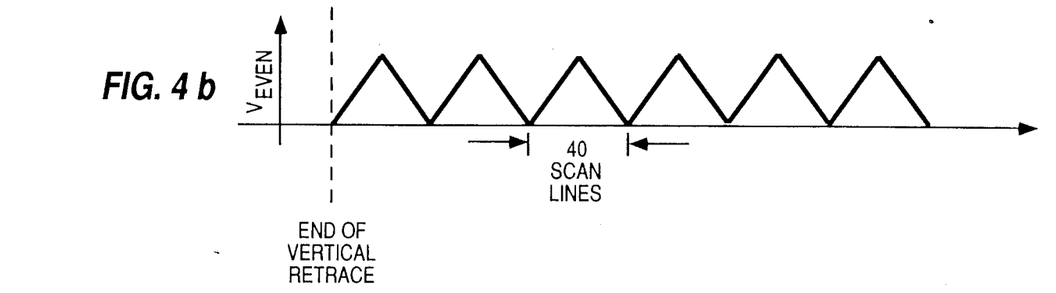

The modulating waveforms shown in FIGS. 4(a) and 4(b) provide a measure of the location of any present horizontal scan line with respect to the horizontal grid lines above and below the present scan line. The modulating waveforms are out of phase with one another, in that the peaks of one correspond in time to the zeros of the other, and vice versa. The sum of the modulating waveforms is always constant. Moreover, the respective zeros and peaks of the two modulating waveforms always coincide with those horizontal scan lines which fall on horizontal grid lines. It is this relative timing, for example, which assures that for the horizontal scan line coinciding with the fourth horizontal grid line, the weighting factor for $V_A$ is one, and the weighting factor for $V_C$ on the fifth horizontal grid line is zero. Although the modulating waveforms are shown as triangular in overall form, the modulating waveforms are in fact stairstep in nature, as apparent when seen in enlarged scale as in FIGS. 4(c) and 4(d). This ensures that the relative weighting factors applied to horizontally adjacent grid points will remain the same for each horizontal scan line in each row of blocks. Alternatively, the modulating waveforms may have an overall sawtooth form, with the trailing edge of each sawtooth pulse falling or rising sharply, as appropriate, during each horizontal retrace. Such modulating waveforms present more complex address control and timing problems. Advantageously, as a triangular waveform, waveform Vodd will have a peak amplitude for each scan line coinciding with an odd numbered horizontal grid line. Conversely, waveform Veven as a triangular waveform will have a peak amplitude for each scan line coinciding with an even numbered horizontal grid line. Similarly, waveforms Vodd and Veven will have zero amplitudes for scan lines coinciding with even and odd numbered horizontal grid lines, respectively. Accordingly, values on even numbered horizontal grid lines are always presented to the multiplying digital-to-analog converter 56, modulated by waveform Veven. Values on odd numbered horizontal grid lines are always presented to multiplying digital-to-analog converter 58, modulated by Vodd.

Each modulating waveform has a period which is related to the number of horizontal scan lines in each row of the grid. The period is equal to forty scan lines for the example shown, that is, twice the number of lines in each row. With reference once again to FIG. 1, one grid point is denoted for each of blocks 82, 84, 86, 88 and 90. When scanning in the eighth row, including blocks 82 and 84, the first two values to be interpolated will be those corresponding to grid points R and T. Value $V_R$ is supplied to the multiplying digital analog converter 56 modulated by waveform Veven. Value $V_T$ is supplied to the multiplying digital to analog converter 58 modulated by waveform Vodd. For the scan line coinciding with eighth horizontal grid line, Veven will have a weighting value of one and Vodd will have a weighting value of zero. Accordingly, the correction value will be $V_R$. At the beginning of the next horizontal row, which is the beginning of the ninth horizontal grid line in the example, Veven will have stepped down to a weighting factor of zero and Vodd will have stepped up to a weighting factor of one. Accordingly, the correction value will be $V_T$.

Each correction value is supplied to only one of the multiplying digital to analog converters. The modulating waveforms, having a period of two rows, that is 40 scan lines, assure that the values on respective horizontal grid lines are sequentially processed as upper and lower boundaries of successive rows. The generation and timing problems of the digital addressing can be substantially reduced, provided that the upper and lower known values for each row of scan lines are applied to the same multiplying digital to analog converters as each subsequent row of scan lines is scanned.

Figure 5:
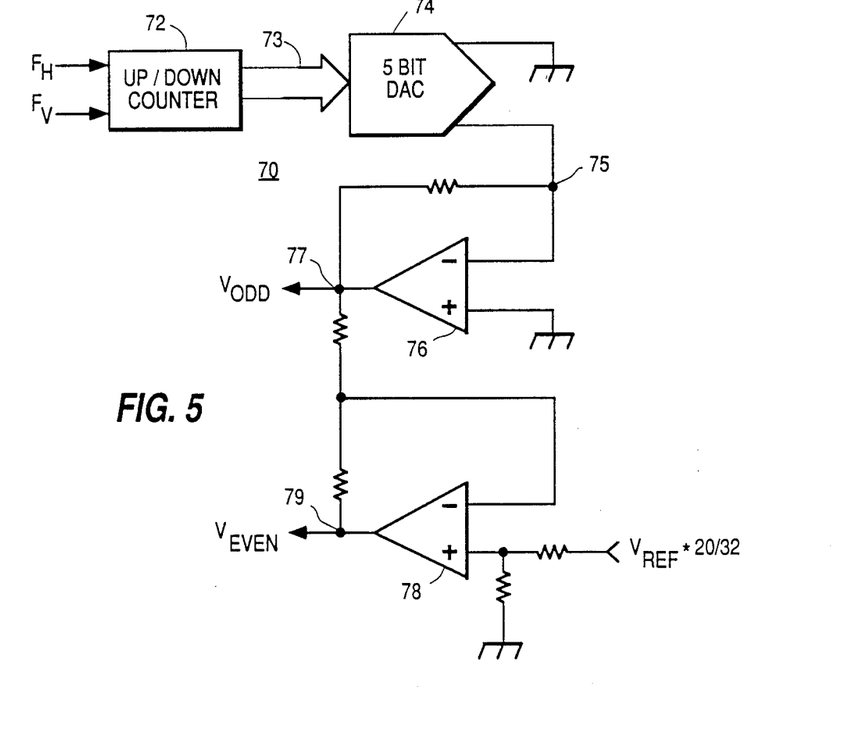
FIG. 5(a) is a block diagram of a circuit for generating the modulating waveforms shown in FIGS. 4(a) and 4(b).
FIG. 5(b) is a clock counting diagram for the circuit shown in FIG. 5(a).
Figure 5B:
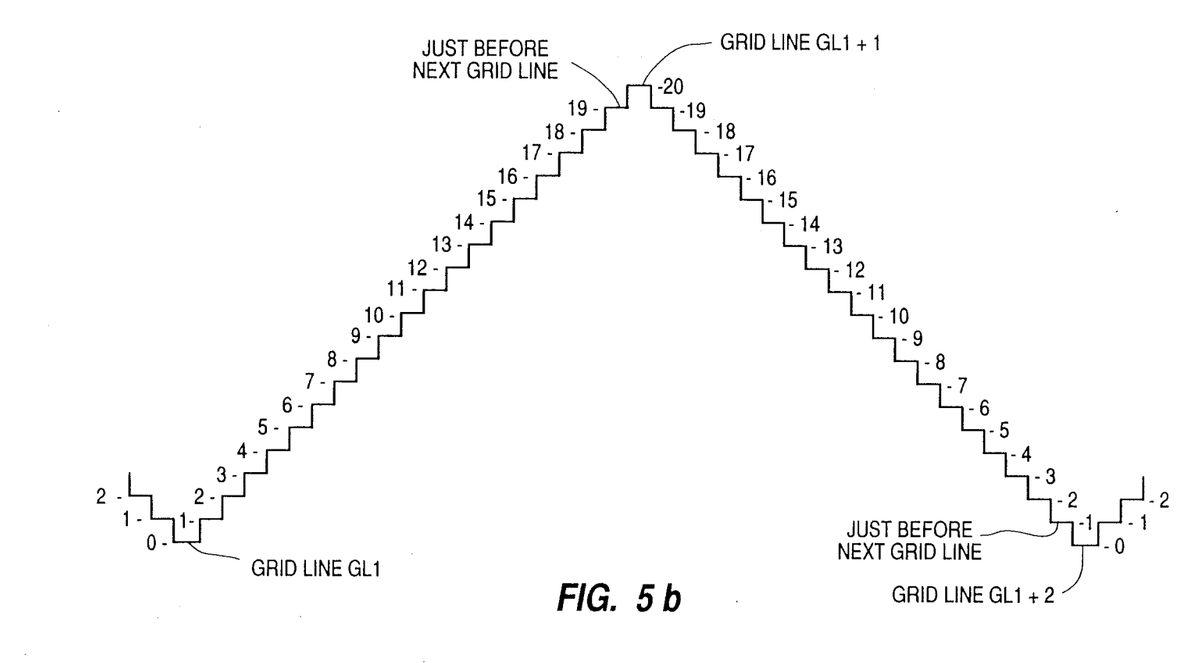

A circuit for generating the modulating waveforms shown in FIGS. 4(a) and 4(b) is shown in FIG. 5(a). An up/down counter 72 receives horizontal and vertical synchronizing pulses, or related timing pulses. The counter 72 continuously counts from 0 to 20 and back from 20 to 0 using the horizontal line retrace pulse, for example, as its clock. A counting diagram for this circuit is shown in FIG. 5(b). Count 0 corresponds to a horizontal grid line, denoted GL1. Count 19 is just before the next grid line. Count 20 corresponds to the next horizontal grid line, GL1+1. The next count 0 corresponds to the next horizontal grid line, GL1+2. The counts for successive rows of scan lines run from 0 to 19, 20 to 1, 0 to 19, 20 to 1, etc. A vertical retrace pulse, for example, resets the counter to lock the generated waveforms to the vertical scan. The digital number is converted to analog form by digital to analog converter 74. Amplifier 76 provides waveform Vodd as an output at terminal 77. Difference amplifier 78 produces the complementary waveform Veven at terminal 79 by subtracting the output of the digital to analog converter from a fixed reference. The fixed reference should be set to the maximum output of the digital to analog converter.

Figure 9:
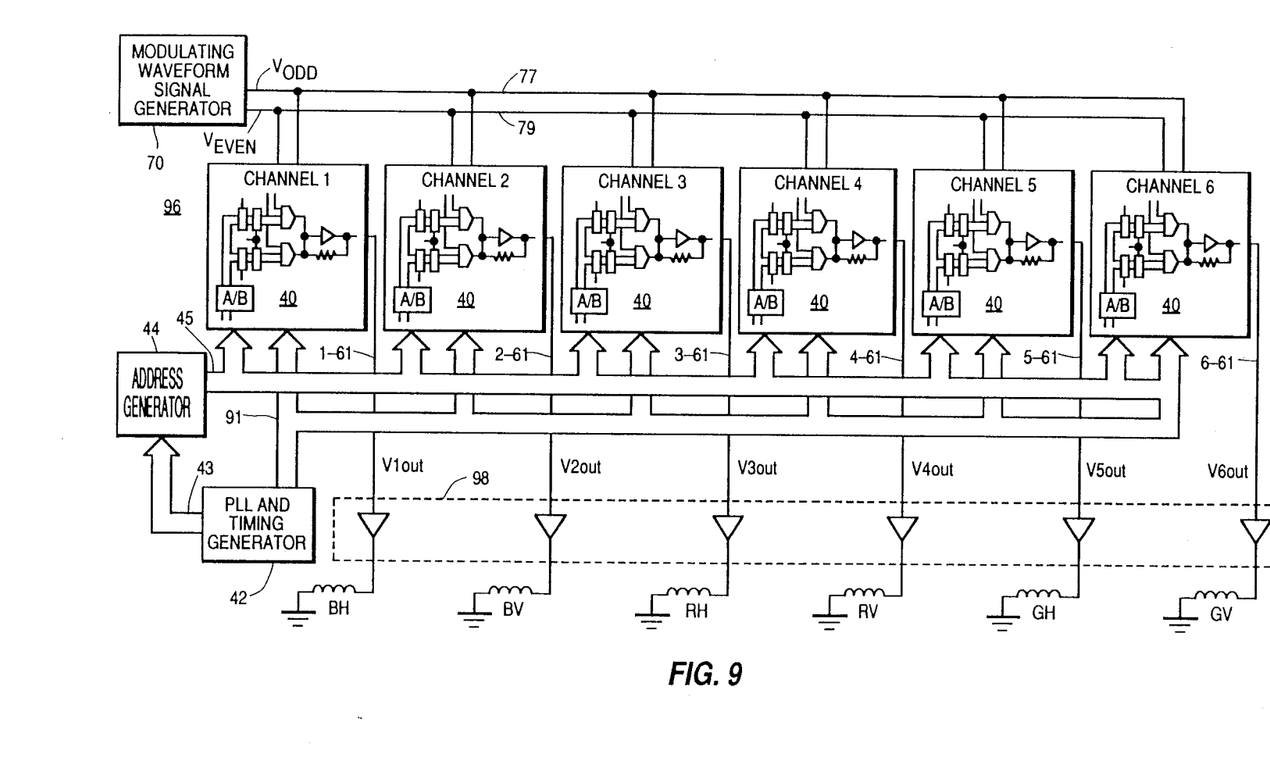
FIG. 9 is a block diagram of a convergence control system having a plurality of channels for generating a plurality convergence correction signals.

A convergence control system for a projection television apparatus is shown in block diagram form in FIG. 9, and generally designated by reference numeral 96. Six convergence correction signals are required, requiring six processing channels. Convergence correction signals must be generated for blue horizontal BH, blue vertical BV, red horizontal RH, red vertical RV, green horizontal GH and green vertical GV. A correction signal/interpolator circuit 40 must be provided for each of the six channels. Each channel contains its own correction value storage means 46, which is uniquely programmed for each channel. Each of the channel processors works in parallel, generating a convergence correction waveform in real time, for each horizontal scan line.

In accordance with an aspect of the invention, all of the six processing channels operate responsive to a single modulating waveform signal generator 70, a single phase lock loop and timing generator 42 and a single address generator 44. The output signals of each channel, on lines 1-61 through 6-61 respectively, are inputs to a convergence output amplifier circuit 98. The amplifiers in circuit 98 drive respective convergence coils, for blue horizontal BH, blue vertical BV, red horizontal RH, red vertical RV, green horizontal GH and green vertical GV. It can be appreciated from FIG. 9 that a digital convergence control system in accordance with this aspect of the invention may be implemented with a minimum of hardware. Indeed, the entire circuit may be integrated in a single chip. A fully digital system would require many more bits for processing and generating the correction signals, and would require latches and digital to analog converters having more bit capacity than is currently feasible for integration into a single chip. The resulting circuit according to this invention therefore provides significant cost savings over a fully digital system, without sacrificing the level of precision necessary to achieve fully satisfactory convergence correction.

What is claimed is:

1. A convergence control system, comprising:
   means for storing a st of digital grid coordinate values defining a convergence correction grid for a video display means;
   multiplying digital to analog converters for calculating analog output values corresponding to said digital grid coordinate values and for calculating intermediate analog output values by analog interpolation between said grid coordinate values, responsive to respective multiplying reference inputs to said converters;
   means for combining said analog output values of said converters as a convergence correction waveform corresponding to said grid coordinate values and said intermediate values; and,
   means for generating different modulating waveforms as said respective multiplying reference inputs for
   first and second multiplying digital to analog converters for converting said grid coordinate values from digital to analog form, said converters.

2. The system of claim 1, wherein said modulating waveforms are complementary in phase.

3. The system of claim 2, wherein said means for generating said modulating waveforms comprises:
   an up/down counter responsive to horizontal and vertical scanning rate signals;
   means for converting the digital output said counter to analog form, defining a first modulating waveform; and,
   a difference amplifier for subtracting said first analog modulating waveform from a fixed reference value to develop a second analog modulating waveform complementary to said first modulating waveform.

4. The system of claim 3, wherein said up/down counter is incremented and decremented at said horizontal scanning rate and reset at said vertical scanning rate.

5. A convergence control system, comprising:
   means for storing a set of digital grid coordinate values defining a convergence correction rid for a video display means;
   multiplying digital to analog converters for calculating analog output values directly from said digital grid coordinate values, responsive to respective modulating reference waveforms configured to generate grid output values and interpolated intermediate output values between said grid output values; and
   means for combining said grid and said intermediate output values of said converters as convergence correction waveforms corresponding to said convergence correction grid.

6. The system of claim 5, comprising means for generating said modulating reference waveforms as analog waveforms of complementary phase.

7. The system of claim 6, comprising means for sequentially supplying said grid coordinate values to said multiplying digital to analog converters.

8. The system of claim 5, comprising means for sequentially supplying said grid coordinate values to said multiplying digital to analog converters.

9. A convergence control system, comprising:
   means for storing a set of digital grid coordinate values defining a convergence correction grid for a video display means;
   multiplying digital to analog converters for calculating analog output values corresponding to said digital grid coordinate values and for calculating intermediate analog output values by analog interpolation between said grid coordinate values, responsive to respective multiplying reference signals;
   means for combining said analog output values of said converters as a convergence correction waveform corresponding to said grid coordinate values and said intermediate values; and, means for generating said respective multiplying reference signals for said converters, having a signal generator for developing analog waveforms of complementary phase, each waveform having a period related to the number of horizontal scanning lines between vertically adjacent grid coordinate values.

10. The system of claim 9, comprising means for sequentially supplying said grid coordinate values to said multiplying digital to analog converters.

11. The system of claim 9, wherein the sum of said analog waveforms is constant.

12. The system of claim 9, wherein said analog waveforms are of generally triangular form.

13. The system of claim 12, wherein said analog waveforms have stairstep slopes.

14. A convergence control system for a television apparatus, comprising:
 a plurality of channels, each having a digital store for a set of grid coordinate values defining a convergence correction rid and a pair of multiplying digital to analog converters;
 addressing means coupled to each of said channels for sequentially supplying said grid coordinate values from each of said data stores to respective multiplying digital to analog converters of each channel for calculating analog output values corresponding to said digital grid coordinate values and for calculating intermediate analog output values by analog interpolation between said grid coordinate values, responsive to respective multiplying reference signals;
 means for generating a pair of complementary waveforms as said respective multiplying reference signals for said multiplying digital to analog converters of each said pair of each said channel; and,
 means for combining said analog output values of said converters in each of said channels to define a convergence corrections signal for each of said channels to control alignment of multiple video images.

15. The system of claim 14, wherein said complementary waveforms are analog signals.

16. The system of claim 14, further comprising timing means for controlling said addressing means.

17. The system of claim 14, wherein each said waveform has a period related to the number of horizontal scanning lines between vertically adjacent grid coordinate values.

18. The system of claim 15, wherein the sum of said analog waveforms is constant.

19. The system of claim 14, wherein said addressing means supplies the same grid coordinate value only to the same one of each said pair of multiplying digital to analog converters.

20. The system of claim 14, wherein the multiple video images originate from video cathode ray projection tubes.

* * * * *

UNITED STATES PATENT AND TRADEMARK OFFICE
CERTIFICATE OF CORRECTION

PATENT NO. : 4,977,355

DATED : December 11, 1990

INVENTOR(S) : Enrique Rodriguez-Cavazos et al.

It is certified that error appears in the above-identified patent and that said Letters Patent is hereby corrected as shown below:

Col. 10, lines 11-13, delete "first and second multiplying digital to analog converters for converting said grid coordinate values from digital to analog form,".

Col. 12, line 10, change "corrections" to --correction--.

Signed and Sealed this

Seventh Day of April, 1992

*Attest:*

HARRY F. MANBECK, JR.

*Attesting Officer*   *Commissioner of Patents and Trademarks*